(12) United States Patent
Pillay

(10) Patent No.: US 9,991,008 B2
(45) Date of Patent: Jun. 5, 2018

(54) SYSTEMS AND METHODS FOR ANALYZING SOFT ERRORS IN A DESIGN AND REDUCING THE ASSOCIATED FAILURE RATES THEREOF

(71) Applicant: Austemper Design Systems Inc., Austin, TX (US)

(72) Inventor: Sanjay Pillay, Austin, TX (US)

(73) Assignee: Austemper Design Systems Inc., Austin, TX (US)

( * ) Notice: Subject to any disclaimer, the term of this patent is extended or adjusted under 35 U.S.C. 154(b) by 0 days. days.

(21) Appl. No.: 15/285,470

(22) Filed: Oct. 4, 2016

(65) Prior Publication Data

US 2017/0213602 A1    Jul. 27, 2017

Related U.S. Application Data

(60) Provisional application No. 62/202,274, filed on Aug. 7, 2015.

(51) Int. Cl.
| | |
|---|---|
| *G11C 29/12* | (2006.01) |
| *G11C 29/52* | (2006.01) |
| *G11C 11/412* | (2006.01) |
| *G06F 17/50* | (2006.01) |
| *G11C 29/54* | (2006.01) |

(52) U.S. Cl.
CPC .... *G11C 29/12015* (2013.01); *G06F 17/5045* (2013.01); *G11C 11/412* (2013.01); *G11C 29/52* (2013.01); *G11C 29/54* (2013.01)

(58) Field of Classification Search
CPC ...................................................... G91R 31/31

USPC ........................................... 714/744, 764.742
See application file for complete search history.

(56) References Cited

U.S. PATENT DOCUMENTS

| | | | | |
|---|---|---|---|---|
| 6,954,916 B2* | 10/2005 | Bernstein | ............ | G06F 17/5022 716/112 |
| 9,450,747 B1* | 9/2016 | Steele | ...................... | H04L 1/242 |
| 2007/0226572 A1* | 9/2007 | Zhang | ................... | G06F 11/261 714/742 |
| 2008/0281572 A1* | 11/2008 | Puri | .................... | G06F 17/5009 703/16 |

(Continued)

*Primary Examiner* — Fritz Alphonse
(74) *Attorney, Agent, or Firm* — John A. Fortkort; Fortkort & Houston PC

(57) ABSTRACT

Systems and methods for analyzing and reducing the failure rates due to soft errors in a design are provided. One such method involves analyzing the design by reading the design from a register-transfer-level language description or a netlist, manufacturing process soft error information, library information and timing constraints for the design to generate the failure in time (FIT) rate for the modules in the design. Another such method involves using the design and a list of memories that need error correction code inserted automatically and limiting the impact to the clock cycle, by analyzing the timing to the inputs and from the outputs of the memories and inserting an in-line or a late timing wrapper, which includes the ECC insert during writes, and ECC check and correct during reads, identifying the registers that need to be shadowed and used in the delayed ECC correct cycle, identifying the clock gating required for various elements in the design to get the correct logic at the conclusion of the re-play cycle of ECC correction in case of late timing ECC correction.

16 Claims, 11 Drawing Sheets

(56) References Cited

U.S. PATENT DOCUMENTS

2016/0103736 A1* 4/2016 Bose .................... G06F 11/073
 714/764

* cited by examiner

SYSTEMS AND METHODS FOR ANALYZING SOFT ERRORS IN A DESIGN AND REDUCING THE ASSOCIATED FAILURE RATES THEREOF

CROSS-REFERENCE TO RELATED APPLICATIONS

This application claims priority from U.S. Provisional Application No. 62/202,274, entitled "SYSTEMS AND METHODS FOR ANALYZING AND REDUCING THE FAILURE RATE DUE TO SOFT ERRORS IN A DESIGN", which was filed on Aug. 7, 2015, and which is incorporated herein by reference in its entirety.

TECHNICAL FIELD OF THE DISCLOSURE

The present disclosure pertains generally to electronic design automation tools used to analyze the failures rates due to soft errors in VLSI (very large scale integration) designs, and more specifically, to systems and methods for formally analyzing failure rates due to soft errors for sequential and non-sequential design elements using soft error rate information from the fabrication process, the timing parameters of the design and the design details in the form of a Register Transfer Language description or a netlist to report the soft error rate of the various components of the design, inserting error-correction code wrappers for the memories in the design to reduce the failure rate due to soft errors, and inserting parity checks for sequential elements to detect failures due to single bit errors in the sequential elements in the design.

BACKGROUND OF THE DISCLOSURE

Enterprise computer systems require very low failure rates to support the extreme reliability requirements of customers. In order to achieve these low failure rates, manufacturers of enterprise computers mandate that the components used in these systems have very low failure rates due to soft errors.

Most current component manufacturers use in-house estimation methods and spreadsheets to compute the failure rates of designs due to soft errors. These estimations are often limited to memories made with SRAMs, and thus do not account for other sequential elements made out of flip-flops. Moreover, these estimates frequently omit non-sequential elements in the design from consideration. Consequently, these estimates tend to underestimate failure rates.

As manufacturing technologies become more advanced, and as the critical dimensions of transistors become smaller (e.g., less than 20 nm), the failure rates due to flip-flops and non-sequential elements have begun to approach the failure rates of SRAMs. Hence, these failure rates need to be computed to ensure that the components still meet the estimated failure rate due to soft error requirements.

At present, the analysis of failure rates due to soft errors is commonly based on the results of questionnaires. These questionnaires, which are typically conducted by the design engineers for various subcomponents of the system, are prone to human errors of omissions and to errors arising from the use of stale data. Moreover, this analysis is typically conducted late in the design cycle due to the manual nature of the work involved. Accordingly, any surprises arising from the results of this analysis tend to cause delays in the execution of the project.

One technique used to reduce the failure rate due to soft errors is the addition of error correction codes to the memory. These include the use of single error correct codes (SECDED) and double error correct codes. These codes introduce logic into the path and cause the design to run slower than the target clock speed. This usually ends up with a re-design of the block which needs the SECDED logic in the memories. Thus, the use of this technique may cause significant delays in the project schedule.

Another requirement for enterprise components is that any failure caused by soft errors that are not corrected need to be flagged (in other words, no silent errors are permitted). One way of meeting this requirement is to add parity to banks of flip-flops, and then detect any parity errors. This tedious process causes additional delays to the project schedule if implemented late in the project, and may necessitate additional manpower to implement any necessary design changes and to verify the main functionality and the added parity.

SUMMARY OF THE DISCLOSURE

In one aspect, a method is provided for analyzing failure rates due to soft errors in the design of a digital electronic device. The method comprises creating, on a computational device, a list of the storage elements in the design, thereby generating a storage element list, and defining a storage element FIT counter. For each storage element in the storage element list, the steps are performed of (a) reading the storage element, (b) adding the FIT rate of the storage element to the storage element FIT counter, (c) creating a list of all of the logic cells forming the cone of logic that forms the data input to the storage element, thereby generating a logic cone list, (d) for each cell in the logic cone list associated with the storage element, (i) reading the cell, and (ii) if the cell is a pass through cell, then adding the FIT rate to the storage element FIT counter, and otherwise adding ½ of the FIT rate to the storage element FIT counter, (e) computing the clock ratio for the storage element, (f) determining the product of the clock ratio and the storage element FIT counter, and (g) adding the product to the storage element FIT counter. After all of the storage elements in the storage element list have been read, the value of the storage element FIT counter is output as the failure rate of the design.

In another aspect, a method is provided for analyzing failure rates due to soft errors in the design of a digital electronic device. The method comprises creating, on a computational device, a list of the storage elements in the design, thereby generating a storage element list, wherein said storage element list includes all of the flip-flops and SRAMs in the device; determining the FIT rate for all of the storage elements; and creating a hierarchical list of modules in the design with the leaf nodes at the head of the hierarchical list. Then, for each module in the hierarchical list, the steps are performed of (a) summing the FIT rates for all flip-flops in the module, (b) summing the FIT rates for all SRAMs in the module, (c) summing the FIT rates for all sub-modules in the module, and (d) recording as the FIT rate for the module the sum of the summed FIT rates for the flip-flops, SRAMs and sub-modules. The name and FIT rate for each module in the hierarchical list is then output.

In a further aspect, a method is provided for inserting a wrapper around the SRAMs in a list of SRAMs. The method comprises creating a list of the SRAMs in the design that require error correction codes (ECCs). For each SRAM in the SRAM list, the steps are performed of (a) creating a list of endpoints from the output (Q) of the SRAM, (b) determining whether any of the endpoints in the list of endpoints is a primary output of the design, (c) for any endpoint in the list of endpoints that is a primary output of the design, marking the SRAM as not ECC-wrapped, and (d) for any endpoint in the list of endpoints that is not a primary output of the design, performing the steps of (i) determining the timing information for the inputs (D) and outputs (Q) of the SRAM based on the logic, timing library information and timing constraints of the design, (ii) determining whether the timing of the SRAM is critical, based on a threshold of slack time for read and write, and (iii) if the timing of the SRAM is not critical, then inserting an in-line wrapper for the SRAM, and otherwise inserting a late timing wrapper for the SRAM.

In still another aspect, a method is provided for inserting a wrapper around the SRAMs in a list of SRAMs in the design of a digital electronic device. The method comprises creating a list of the SRAMs in the design that require error correction codes (ECCs), wherein each SRAM has inputs and outputs associated therewith; for each SRAM in the SRAM list, (a) inserting (i) in-line ECC generation logic for the input of the SRAM, (ii) read-modify-write logic for a partial word write operation, (ii) ECC error insert logic, and (iii) logic for checking and correcting for SECDED during a read operation, and (b) wrapping the SRAM with the inserted logic, thereby creating an SRAM wrapper; generating a list of all SRAM instances; and for each SRAM instance in the list of SRAM instances, replacing the SRAM with the SRAM wrapper.

In yet another aspect, a method is provided for creating logic for a replay cycle when a correctable ECC error is detected in an SRAM. The method comprises (a) creating a list of output ports for the SRAM with a delayed timing ECC wrapper; (b) for each output port in the list of output ports, creating a list of end points which use the output port; (c) for each end point in the list of end points, creating a list of all start points which are in the cone of logic of the endpoint; (d) for each start point in the list of start points, creating shadow registers and associated logic; (e) creating replay enable for each end point in the list of end points; and (f) creating a clock gating signal for elements in the design of the SRAM that are not in the list of end points.

In another aspect, a tangible, non-transient medium is provided having suitable programming instructions recorded therein which, when implemented by one or more computer processors, performs any of the foregoing methods, or performs any step or set of steps contained in any of the foregoing methods.

BRIEF DESCRIPTION OF THE DRAWINGS

For a more complete understanding of the present invention and the advantages thereof, reference is now made to the following description taken in conjunction with the accompanying drawings in which like reference numerals indicate like features.

DETAILED DESCRIPTION OF THE DISCLOSURE

Definitions

The following terms as used in this disclosure have the meanings specified below.

"Netlist" refers to a textual description of the connectivity of an electrical circuit made of components. Since components are generally gates, a netlist is typically a connection of gates.

"Intermediate Representation" (IR) is the data structure or code used internally by a compiler or virtual machine to represent source code.

"Register Transfer Language" (RTL) refers to an Intermediate Representation (IR) used to describe data flow at the register-transfer level of an architecture. RTL is a design abstraction which models a synchronous digital circuit in terms of the flow of digital signals (data) between hardware registers, and the logical operations performed on those signals.

"Flip-flop" refers to a circuit that has two stable states, and which can be used to store information. Flip-flops serve as the basic storage elements in the designs of many digital electronic devices.

"Failure in time rate" or "FIT rate" refers to the frequency with which an engineered system or component fails. The FIT rate is typically expressed in failures per unit time.

"MUX cell" refers to a multiplexor cell. Such a cell selects one of several input signals and forwards the selected input signal into a single line. Thus, for example, a multiplexer of 2" inputs has n select lines, which are used to select which input line to send to the output.

"XOR cell" refers to a logic gate which outputs a value of "true" only when one both inputs are the same.

"NAND cell" refers to a negative-AND cell, that is, a logic gate which produces an output of "false" only if all of its inputs are "true".

"NOR cell" refers to a logical NOR gate, that is, a digital logic gate that implements logical NOR (the negation of the OR operator). It generates a HIGH output (1) if both of the inputs to the gate are LOW (0), and generates a LOW output (0) if one or both inputs are HIGH (1).

"Pass through cell" refers to a cell (such as, for example, an inverter, XOR or MUX cell) having at least one power supply line passing through it.

"SRAM" refers to static random access memory, that is, random access memory (RAM) that retains data bits in its memory as long as power is being supplied.

"Storage element" refers to an element in a digital electronic device, such as a flip-flop or SRAM, that stores information.

"Clocking event" refers to a periodic event which causes the state of a memory element to change. A clocking event can be rising or falling edge, or high or low level.

Figure 9:
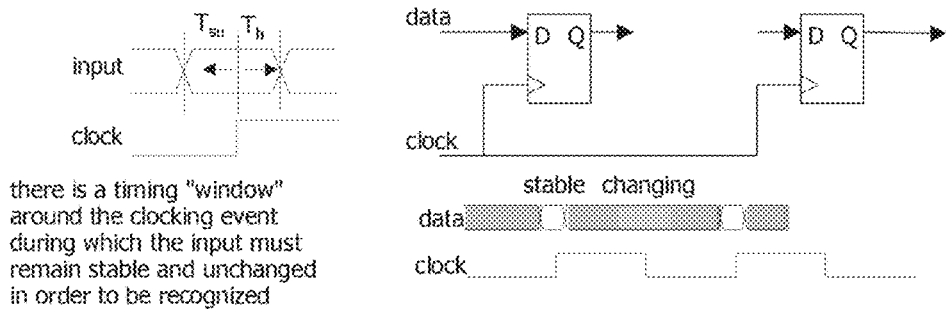
FIG. 9 is an illustration of the concept of a timing window as used herein.

"Timing window" refers to a window around a clocking event during which the input to a memory element must remain stable and unchanged in order to be recognized. The concept of a timing window is illustrated in FIG. 9.

"Clock ratio" refers to the speed ratio between the frontside bus (FSB) and central processing unit (CPU) of a computational device.

Figure 10:
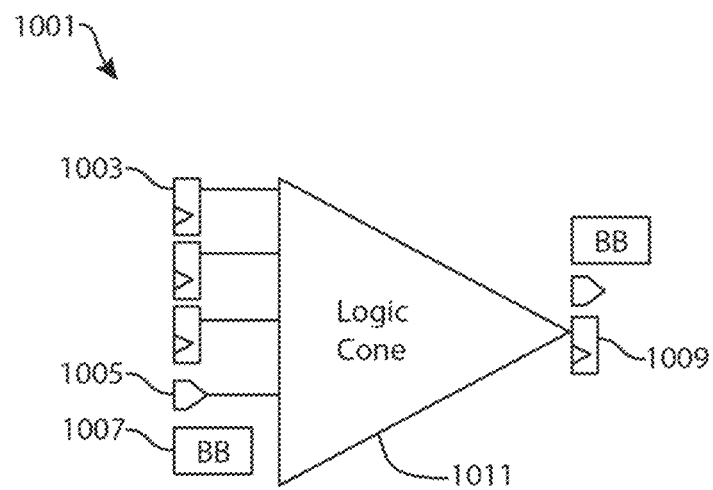
FIG. 10 is an illustration of the concept of a logic cone.

"Logic cone" refers to groups of logic bordered by registers, ports, or black boxes. An example of a logic cone is depicted in FIG. 10.

"Compare point" refers to the output border of a logic cone.

"Leaf node" refers to the lowest level of abstraction in the design of a digital electronic device.

"Wrapper" refers to a subroutine in a computer program or software library whose main purpose is to call another subroutine or to make a system call, with little or no additional computation.

"Inline" refers to a function or subroutine in the C and C++ programming languages which is qualified with the keyword "inline". Such functions or subroutines serve as compiler directives that suggest (but do not require) that the compiler substitute the body of the function or subroutine by performing inline expansion, and also serve to change linkage behavior.

"Inline expansion" refers to the practice of inserting the code of a function or subroutine at the address of each call to the function or subroutine, thus saving the overhead of a call to the function or subroutine.

"Timing wrapper" refers to a wrapper on the inputs and outputs of an SRAM that can be used to model the actual delays, set-up and hold requirements of the SRAM.

Technical Description

It has now been found that the foregoing needs may be met by the devices and methodologies disclosed herein. In a preferred embodiment, these devices and methodologies, which may be implemented as various algorithms, software programs, and electronic design automation tools, provide for the analysis of failure rates due to soft errors in the designs of digital electronic devices.

Preferably, the design to be analyzed is first described in a register transfer language (RTL) (such as, for example, Verilog or VHDL) or in a Netlist. An electronic design automation (EDA) tool is provided to read, analyze and extract the relevant metadata from the foregoing description of the design to glean relevant information therefrom. Such information may include, for example, the number of flip-flops, storage elements and logic gates in the design. The tool also obtains timing information for the design in the form of design constraints, and determines soft error rates in the design from process soft error rate information provided by the fabrication company. The tool then uses this information to compute the failure rate of the design on a hierarchical block basis, and provides a report with the information containing the failure rates and their contributing factors (including, for example, the failure rates due to soft error rates in memories, flip-flops and logic gates). In some cases, the tool may provide hierarchical failure rate information for various sub-blocks of the design.

In some embodiments of the systems and methodologies described herein, the analyzed RTL or Netlist is used in conjunction with an identified list of storage devices to automatically insert a wrapper around the identified storage devices. This wrapper includes the logic associated with the insertion of single-error correcting and double-error detecting (SECDED) bits and logic during writes to the memory. This approach increases the width of the storage element to accommodate the inserted SECDED bits and logic associated with the SECDED correction during a read operation.

In other embodiments of the systems and methodologies disclosed herein, the analyzed RTL or Netlist is used in conjunction with an identified list of storage elements to automatically insert a wrapper around the identified storage elements. This wrapper includes the logic associated with the insertion of SECDED bits and logic during writes to the storage element. This approach increases the width of the storage element to accommodate the inserted SECDED bits and the logic associated with the SECDED correction during a read operation.

In still other embodiments of the systems and methodologies disclosed herein, the analyzed RTL or Netlist is used to identify the list of flip-flops in a design. The design database and timing constraints are then read to identify the maximum parity grouping that can be achieved without significant impact to the maximum clock rate of operation for the design. The logic required to create the parity for the identified grouping of flip-flops is then inserted. Additional flip-flops are then inserted into the design for the parity, and the logic to check the inserted parity value in the added flip-flop is inserted with the computed value in the read cycle of the flip-flops. An error flag is then set when the parities differ.

In further embodiments of the systems and methodologies disclosed herein, the analyzed RTL or Netlist and timing constraints are utilized to identify the type of SECDED (either in line or late timing wrapper) such that the inserted logic does not significantly degrade the maximum clock rate at which the design can operate. By way of example, the SECDED logic is usually log 2(N) number of logic gates followed by (log 2(N)+1) number of XOR gates to do the SECDED function, where N is the number of bits in the RAM (the width of the RAM read data). Hence, for 64 bit data, this will be 5 AND gates+6 XOR gates worth of delay. With the late timing wrapper, this may be reduced to 1 MUX. In most libraries, the delays of MUX and XOR are approximately the same. Hence, in such an example, one would expect about an 11→1 reduction in the inserted delay by using the late timing wrapper.

Referring now to the drawings, particular, non-limiting embodiments of systems, methodologies and tools for analyzing and reducing failure rates due to soft errors in a design are illustrated. Such systems, methodologies and tools may include a number of components.

Figure 1:
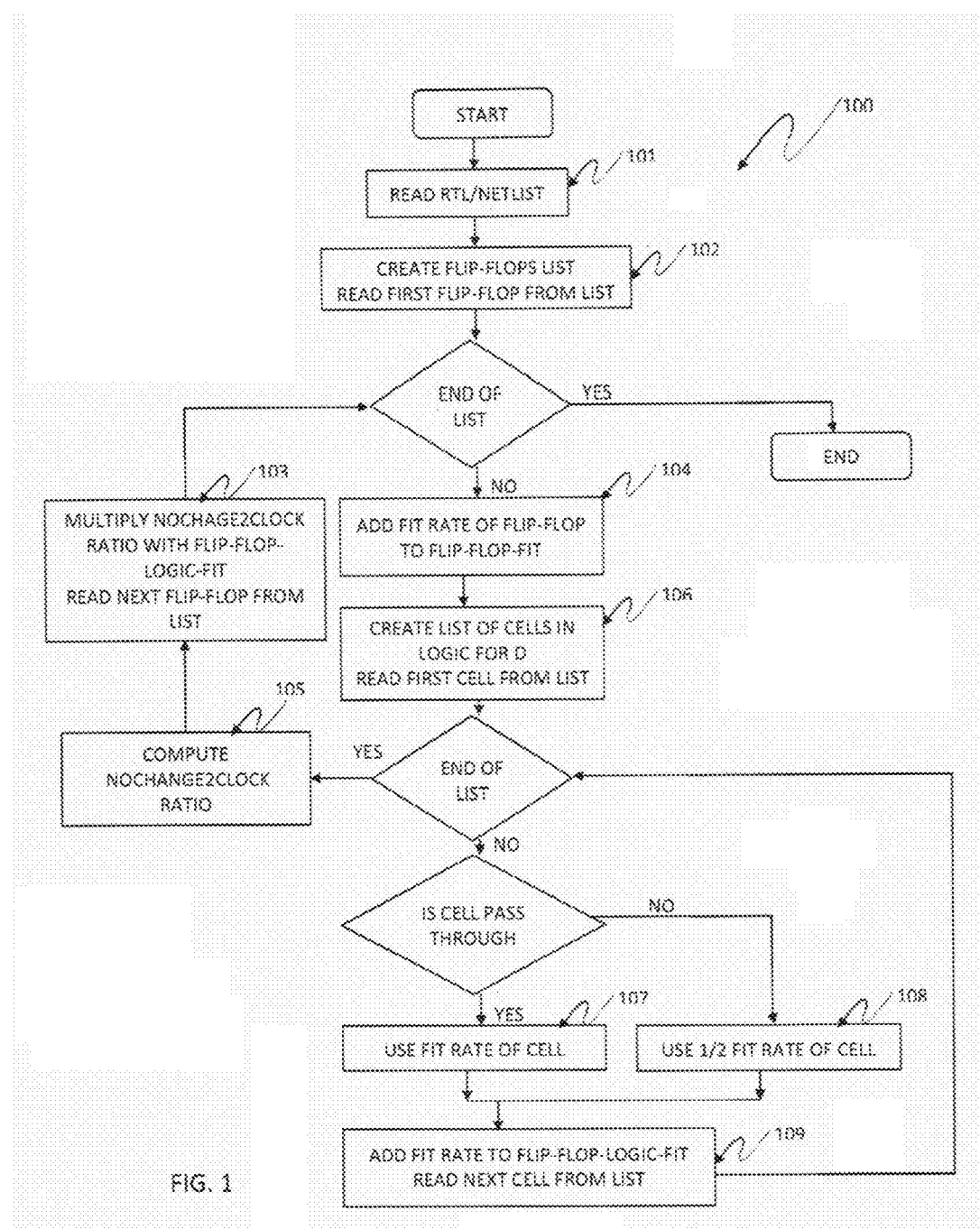
FIG. 1 is a flow chart of a method for computing the failure in time (FIT) rate for the Flip-Flops in a design.

FIG. 1 illustrates a first particular, non-limiting embodiment of a method in accordance with the teachings herein for computing the FIT rate in the design of a digital electronic device. The method depicted therein computes the FIT rate for the logic associated with the flip-flops. The method of FIG. 1 may be implemented, for example, by a suitable tool which inputs the design of the device and outputs the calculated FIT rate.

In the particular embodiment of the method 100 depicted in FIG. 1, the design of the digital electronic device is read 101 into the tool, preferably in the form of an RTL or a netlist. A list of all the flip-flops in the design is then created, and the first element of this flip-flop list is read 102.

The process then determines whether it is at the end of the flip-flop list. If so, the process terminates. If not, the FIT rate of the flip-flop is added 104 to a flip-flop FIT counter. A list is then created of all the logic cells that are a part of the cone of logic that form the data input D to the flip-flop, and the first cell is read 106 from this list.

If the first cell is determined to be a pass through cell (such as, for example, an inverter, XOR or MUX cell), a scale factor of 1.0 is applied 107 to the FIT rate for the cell using the fit rate for the cell from the fabrication process data. If the first cell is determined to not be a pass through cell (for example, if the first cell is determined to be an input blocking cell such as a NAND or NOR cell), a scale factor of 0.5 is applied 108 to the FIT rate for the cell. The scaled FIT rate is added 109 to the flip-flop logic FIT, and the next cell is read from the list. The foregoing cell FIT rate computation is then repeated for all elements in the cell list.

When the end of the cell list is reached, the library information available for the flip-flop is utilized to obtain the timing window value for the flip-flop, and the clock cycle information is obtained from the timing constraints associated with the design. This information is then used to compute 105 the clock ratio. The clock ratio is used as a scale factor for the flip-flop logic FIT value (that is, the product of the clock ratio and the flip-flop logic FIT is calculated), and the resulting scale value is added to the flip-flop FIT 103. The foregoing flip-flop FIT computation is then repeated for each of the flip-flops in the flip-flop list.

Figure 2:
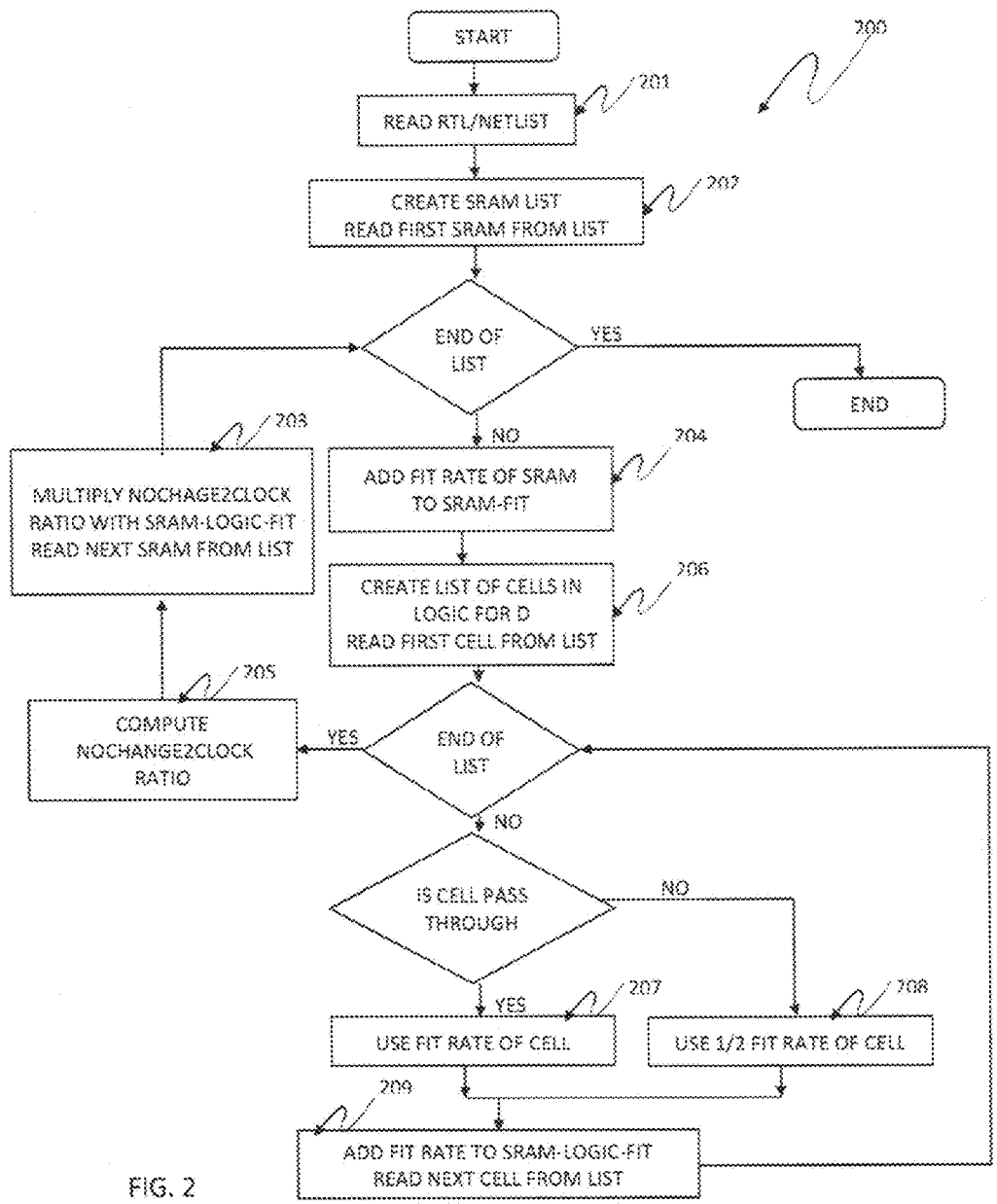
FIG. 2 is a flow chart of a method for computing the failure in time (FIT) rate for the SRAMs in a design.

FIG. 2 illustrates a second particular, non-limiting embodiment of a method in accordance with the teachings herein for computing the FIT rate in the design of a digital electronic device. The method depicted computes the FIT rate for the logic associated with the SRAMs of the device.

The method of FIG. 2 may be implemented by a suitable tool which inputs the design of the device and outputs the calculated FIT rate. In the particular embodiment of the method 200 depicted therein, the method commences when the design of the digital electronic device is read 201 into the tool, preferably in the form of an RTL or a netlist. A list of all the SRAMs in the design is then created, and the first element of this SRAM list is read 202.

The process then determines whether it is at the end of the SRAM list. If so, the process terminates. If not, the FIT rate of the SRAM is added 204 to the SRAM FIT counter. A list is then created of all the logic cells that are a part of the cone of logic that form the data input D to the SRAM, and the first cell is read 206 from this cell list.

If the cell is determined to be a pass through cell (such as, for example, an inverter, XOR or MUX cell), a scale factor of 1.0 is applied 207 to the FIT rate for the cell using the fit rate for the cell from the fabrication process data. If the cell is determined to not be a pass through cell (for example, if the cell is determined to be an input blocking cell such as a NAND or NOR cell), a scale factor of 0.5 is applied 208 to the FIT rate for the cell. The scaled FIT rate is added 209 to the slip-flop logic FIT, and the next cell is read from the list. This cell FIT rate computation is repeated for all elements in the cell list.

When the end of the cell list is reached, the library information associated with the SRAM is used to obtain the timing window value for the SRAM, and the clock cycle information is obtained from the timing constraints of the design. This information is then used to compute 205 the clock ratio. The clock ratio is then used as a scale factor for the SRAM logic FIT value (that is, the product of the clock ratio and the SRAM FIT is calculated), and the resulting scale value is added to the SRAM FIT 203. The foregoing SRAM FIT computation is repeated for each of the SRAMs in the SRAM list.

Figure 3:
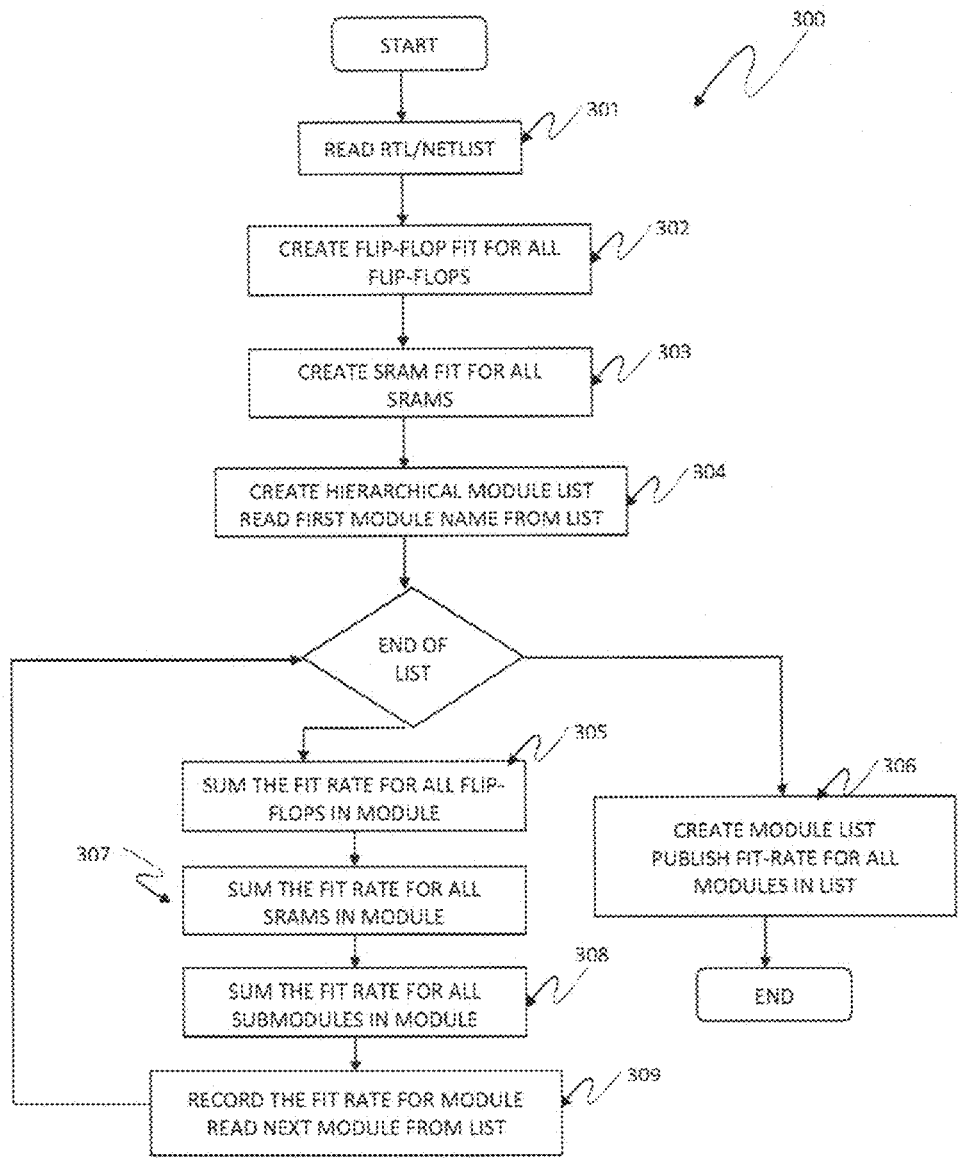
FIG. 3 is a flow chart of a method for the computation of the FIT rate for modules in a design.

FIG. 3 is a flowchart illustrating a particular, non-limiting embodiment in accordance with the teachings herein of a system and method for computing the FIT rate, in a hierarchical manner, of modules in the design of a digital electronic device. As seen therein, in the particular embodiment of the method 300 depicted therein, the method commences when the design of the digital electronic device is read 301 into the tool, preferably in the form of an RTL or a netlist. The FIT rate for all flip-flops is then created 302 or computed using, for example, the methodology depicted in FIG. 1. Similarly, the FIT rate for all SRAMs is then created 303 or computed using, for example, the methodology depicted in FIG. 2.

Next, a list of modules is created hierarchically 304 such that the leaf nodes in the hierarchy are at the head of the list. The first module of this module list is then read. If the end of the module list has not been reached, the FIT rate of all flops in the module are summed 305, the FIT rates for all the SRAMs in the module are summed 307, the FIT rate of all the sub-modules in the module are summed 308, the summed FIT rate is recorded 309 as the module FIT rate, and the next module is read from the module list. Once the end of module list is reached, the module name and the FIT rate for each of the modules in the module list are published 306.

Figure 4:
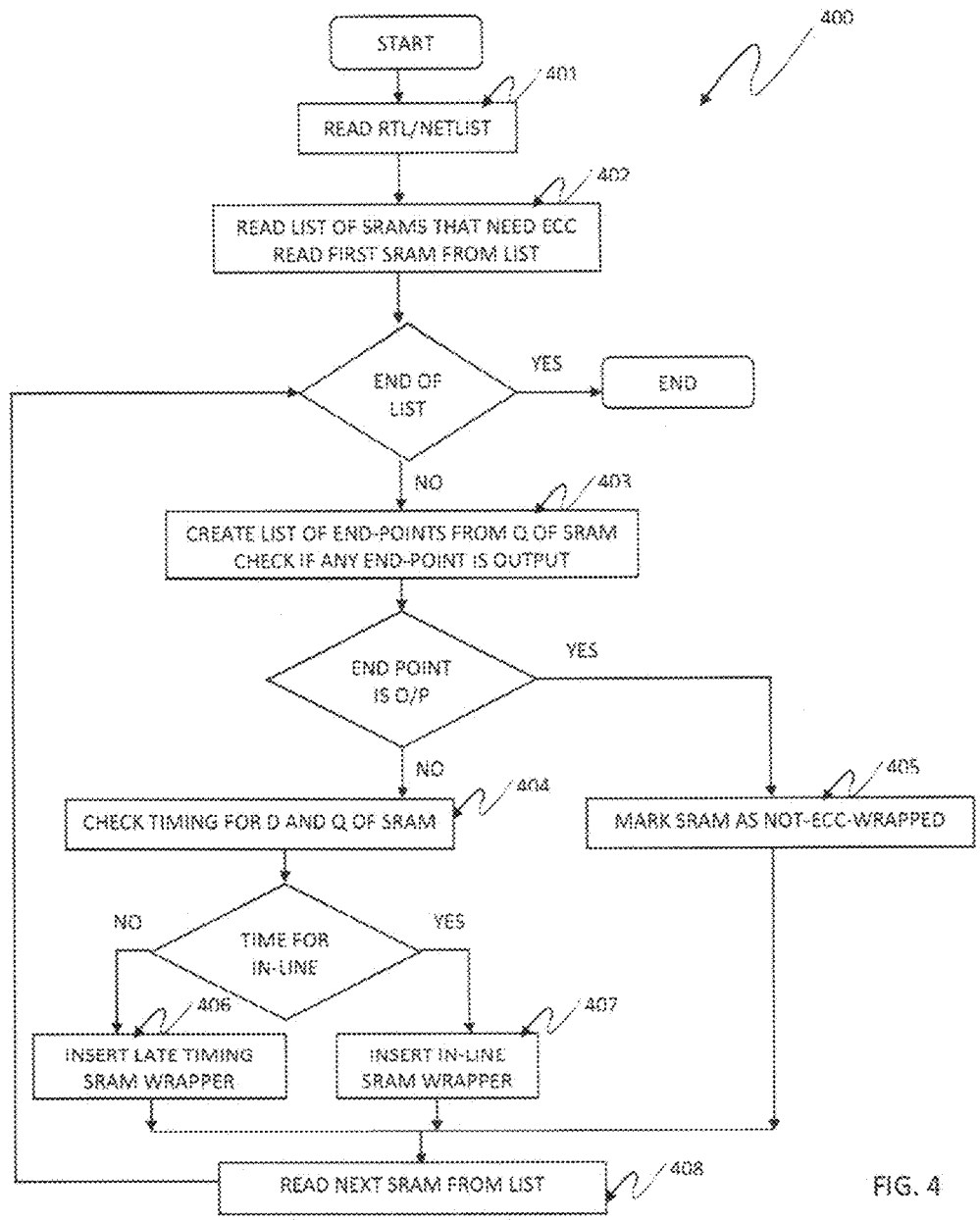
FIG. 4 is a flow chart of a method for the insertion of SRAM wrappers in a design.

FIG. 4 is a flowchart illustrating a particular, non-limiting embodiment in accordance with the teachings herein of a system and method for inserting a wrapper around the SRAMs in a list of SRAMs that need single error correct double error detect (SECDED) error correction codes (ECC). The wrapper includes the logic necessary for adding the ECC during the writes to the SRAM and checking and correcting errors during read of SRAMs.

As seen therein, in the particular embodiment of the method 400 depicted therein, the method commences when the design of the digital electronic device is read 401 into the tool, preferably in the form of an RTL or a netlist. A list of SRAMs that need ECC is then added 402, thus defining an SRAM wrapper list.

For each of the SRAMs in the SRAM wrapper list, a list of all the end points from the output (Q) of the SRAM is created 403. A determination is then made as to whether any of these end points is a primary output of the design. If so, the SRAM is marked as "not ECC wrapped".

For any end points in the list that are not determined to be a primary output of the design, the timing information for the inputs (D) and from the outputs (Q) of the SRAM is determined, based on the logic, timing library information and the timing constraints of the design. If the timing is determined to not be critical (based, for example, on a threshold of slack time for read and write), an in-line wrapper for the SRAM is inserted 407. If the timing is determined to be critical, then a late timing SRAM wrapper is inserted 406. This process is repeated for all SRAMs in the SRAM wrapper list.

Figure 5:
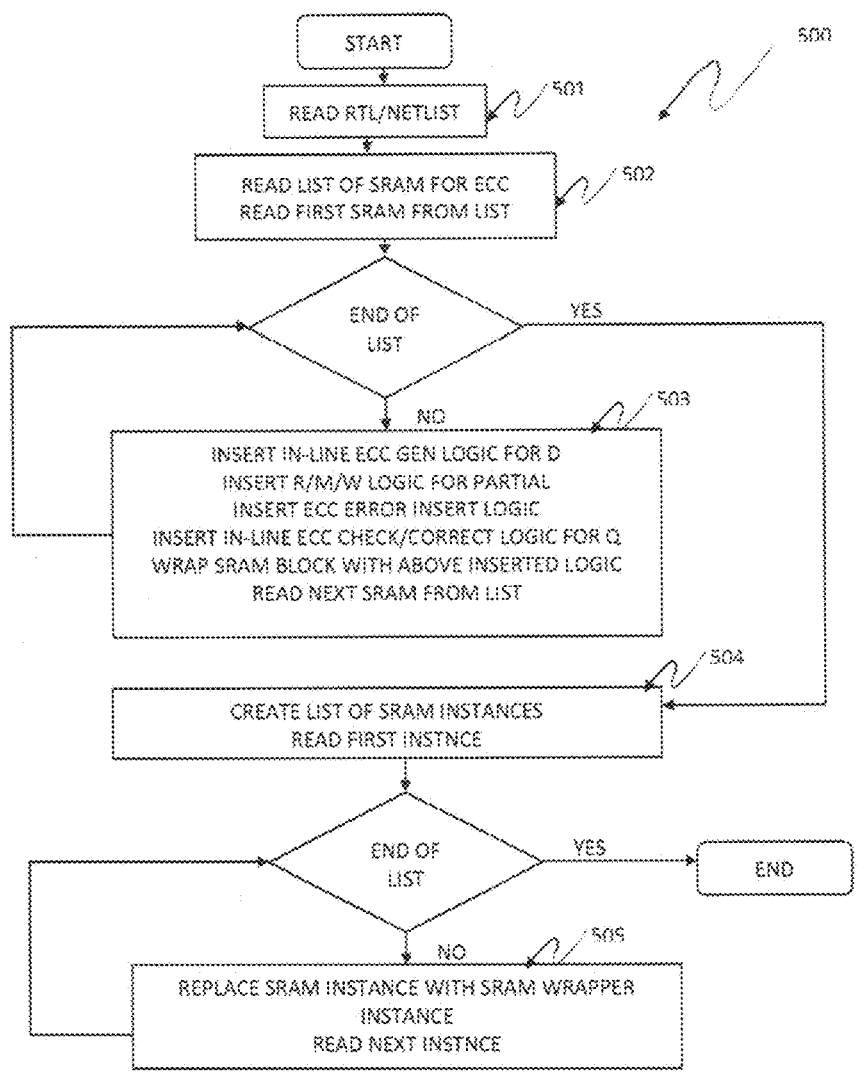
FIG. 5 is a flow chart of a method for the in-line SRAM wrapper insertion and wrapper insertion in a design.

FIG. 5 is a flowchart for a particular, non-limiting embodiment of a method 500 for the insertion of the in-line SRAM wrapper and its associated logic additions and modifications. The method commences with the reading 501 of the design into the tool in form of an RTL or netlist. A list of the SRAMs that need the in line wrapper is then created, and the first element of this SRAM list is read 502. For each SRAM in the list, the following items are inserted: (a) the in-line ECC generation logic for the input of the SRAM including the generation of the ECC for SECDED; (b) the read modify write logic for a partial word write; (c) the ECC error insert logic to facilitate the checking of ECC logic; and (d) the logic for checking and correcting for SECDED during a read operation, along with the clock gating signal required during a read modify write cycle. After the foregoing insertions, the SRAM is then wrapped 503 with the inserted logic. This process is repeated for all SRAMs in the list.

Next, a list of SRAM instances is created 504. For each SRAM instance on the list, the SRAM is replaced with the SRAM wrapper, and any necessary changes are made 505 to the connections and the clock gating to achieve correct functionality.

Figure 6:
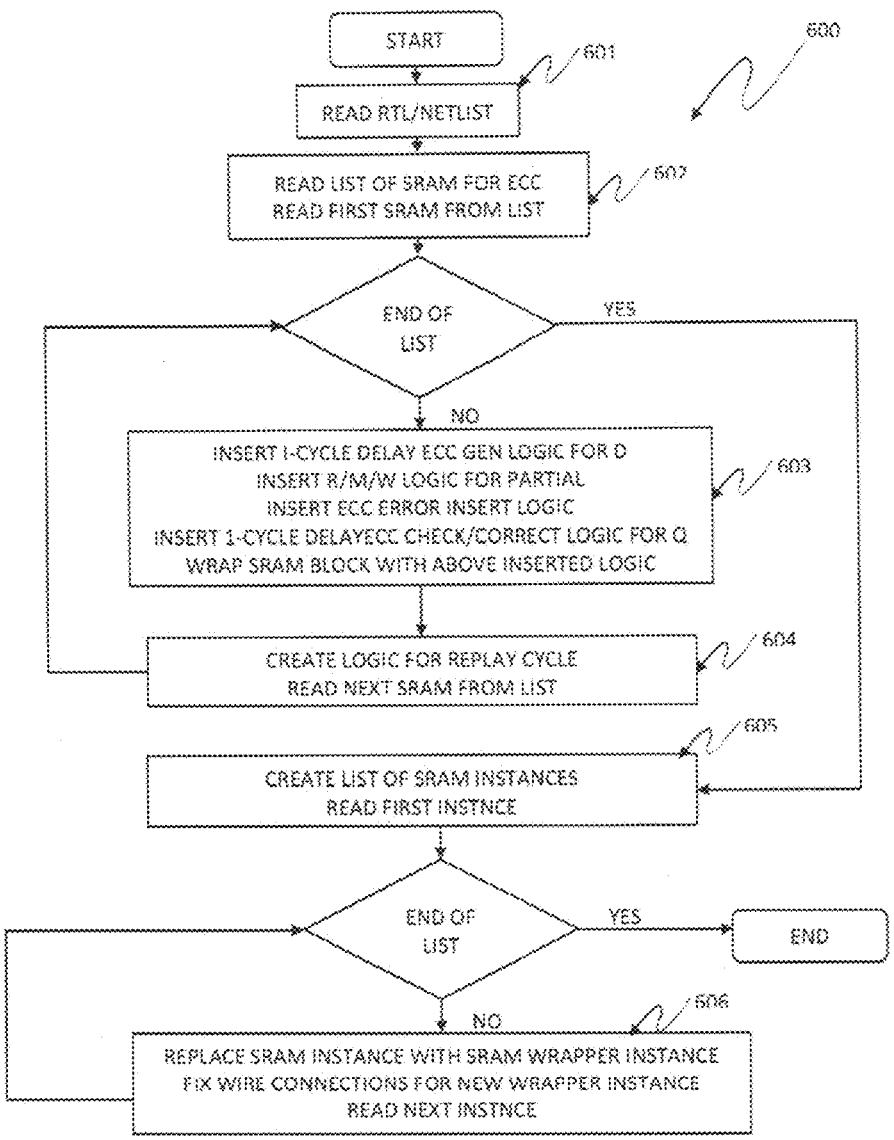
FIG. 6 is a flow chart of a method for the late timing SRAM wrapper insertion and wrapper insertion in a design.

FIG. 6 is a flowchart depicting a particular, non-limiting embodiment of a method 600 for the insertion of the late timing SRAM wrapper and its associated logic additions and modifications in accordance with the teachings herein. The method includes the reading 601 of the design into the tool in form of an RTL or netlist, creating a list of the SRAMs that need the in line wrapper for the SRAMs, reading 602 the first element of this SRAM list, inserting the delayed timing (1 cycle) ECC generation logic for the input of the SRAM including the generation of the ECC for SECDED, inserting the read modify write logic for a partial word write, inserting the ECC error insert logic to facilitate the checking of ECC logic, inserting the delayed (1 cycle) logic for checking and correcting for SECDED during a read operation along with the clock gating signal required during a read modify write cycle, wrapping 603 the SRAM with the inserted logic, creating 604 the logic required for the replay cycle when a ECC error is detected, and repeating this for all SRAMs in the list. For each SRAM in the design that is a part of the SRAM list, the SRAM is replaced 606 with the SRAM wrapper, and any necessary changes are made to the connections and the clock gating to achieve correct functionality.

Figure 7:
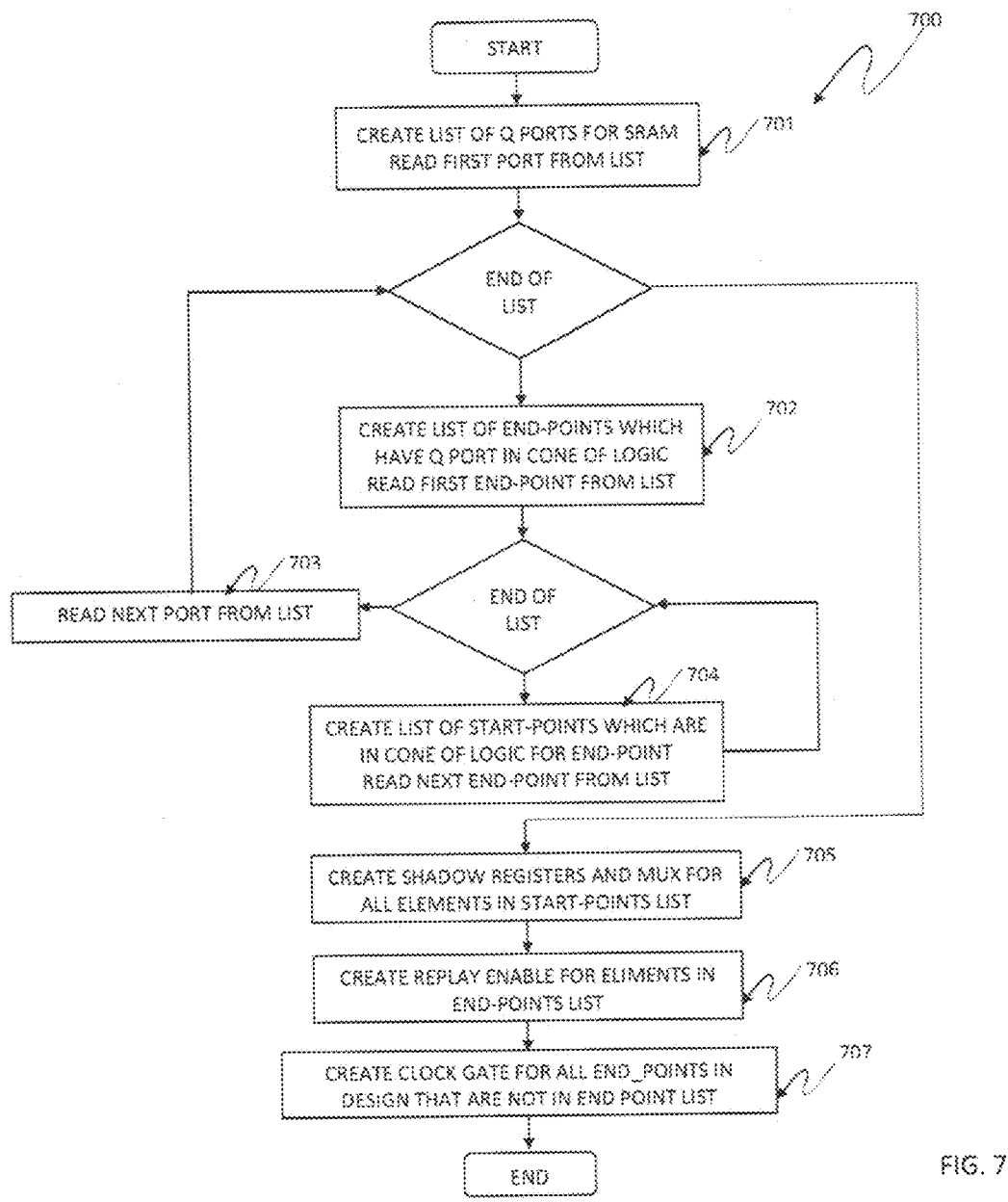
FIG. 7 is a flow chart of a method for creating the re-play logic for the late timing SRAM wrapper in a design.

FIG. 7 is a flow chart depicting a particular, non-limiting embodiment of a method 700 for the creation of the logic for the replay cycle when a correctable ECC error is detected. This method includes the creation 701 of list of output ports for the SRAM with delayed timing ECC wrapper. For each element in this list, a list of end points is created 702 which use the output. For each element in the end point list, a list is created 704 of all start points which are in the cone of logic for the end-point. Shadow registers and associated logic are created 705 for all the elements in the start point list. Replay enable is created 706 for elements in the end point list, and the clock gating signal is created 707 for the elements in the design that are not in the end point list.

Figure 8:
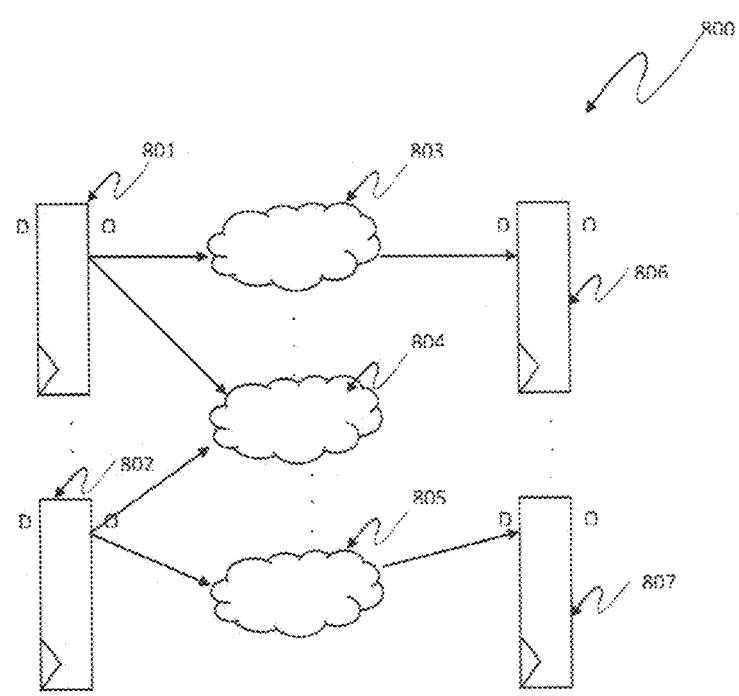
FIG. 8 is the block diagram of the logic between sets of flip-flops showing the logic cone.

FIG. 8 shows a typical representation of the logic in a design where the start points are flip-flops 801 and 802, the cone of logic is shown as a cloud 803, 804, 805 and the end points are flip-flops 806 and 807.

Some of the systems and methodologies disclosed herein utilize the concept of a timing window. As seen in FIG. 9, the concept of a timing window is related to the concepts of set-up time (that is, the minimum time $T_{su}$ before a clocking event by which the input must be stable) and hold time (that is, the minimum time $T_h$ after the clocking event until which the input must remain stable). The timing window thus specifies the window around the clocking event during which the input must remain stable and unchanged in order to be recognized.

As noted above, some of the systems and methodologies disclosed herein segment designs into manageable sections called logic cones. An example of a logic cone is depicted in FIG. 10. As seen in the device 1001 depicted therein, each logic cone 1011 is a group of logic bordered by registers 1003, ports 1005 or black boxes 1007. The output border 1009 of the logic cone 1001 is referred to as the compare point.

As noted above, some of the systems and methodologies disclosed herein utilize the concept of timing constraints. Such constraints may be specified for any nets or paths in the design, or may be specified globally. For example, timing constraints may be specified for a set of paths by first identifying a group of start and end points. The start and end points may be flipflops, I/O pads, latches, or RAMs. The worst-case timing on the set of paths may then be controlled by specifying a single delay requirement for all paths in the set.

Timing constraints may be specified in various manners in the systems and methodologies described herein. For example, timing constraints may be entered in the design through a hardware design language (HDL) or schematic. Timing constraints may also be specified in constraints files such as, for example, UCF, NCF, PCF, or XCF files.

The various methodologies disclosed herein may be implemented by one or more software packages or tools. These software packages or tools will typically include one or more instances of tangible, non-transient medium having suitable programming instructions defined which, when executed by one or more processors, causes the method to be performed. The software packages or tools may be implemented in various format including, for example, as stand-alone applications or distributed applications.

Figure 11:
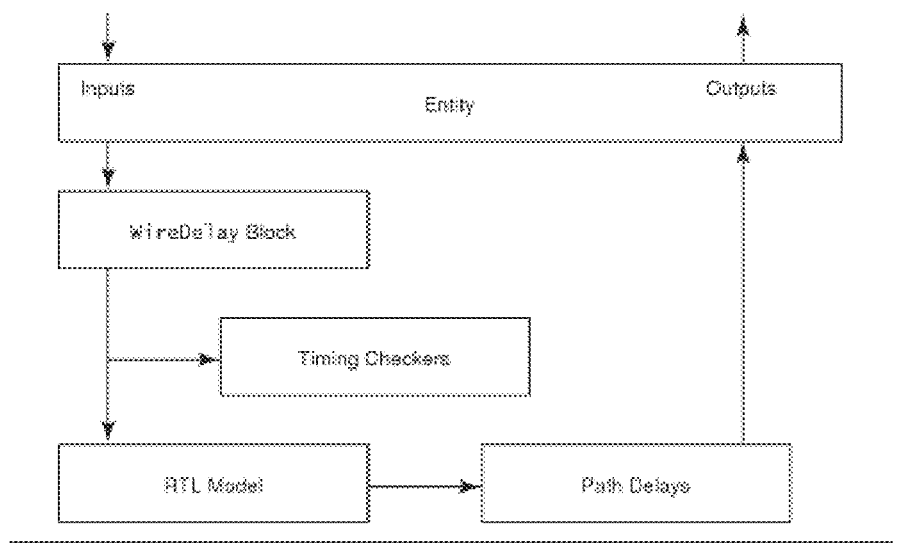
FIG. 11 is an illustration of the structural view of a wrapper.

As noted above, some of the systems and methodologies disclosed herein utilize wrappers. Wrappers in general are known to the art and are described, for example, in Chapter 13 ("Adding Timing to your RTL Code") at pp. 191-208 of Richard Munden, "ASIC and FPGA Verification: A Guide to Component Modeling" (Academic Press, 2004), which chapter is incorporated herein by reference in its entirety. FIG. 11 is an excerpt from the foregoing reference, and depicts the structure of a wrapper used to wrap an RLT model in a set of path delay and timing check procedures. Such a wrapper may be used, for example, to check the timing of a chip to ensure that it interfaces correctly with the rest of the system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for analyzing failure rates due to soft errors in the design of a digital electronic device, comprising:
    creating, on a computational device equipped with a tangible, non-transient storage medium and at least one computer processor, a list of the storage elements in the design, thereby generating a storage element list;
    defining a storage element FIT counter;
    for each storage element in the storage element list, implementing, with the at least one computer processor, programming instructions recorded in the storage medium which perform the steps of
    (a) reading the storage element,
    (b) adding the FIT rate of the storage element to the storage element FIT counter,
    (c) creating a list of all of the logic cells forming the cone of logic that forms the data input to the storage element, thereby generating a logic cone list,
    (d) for each cell in the logic cone list associated with the storage element,
    (i) reading the cell, and
    (ii) if the cell is a pass through cell, then adding the FIT rate to the storage element FIT counter, and otherwise adding ½ of the FIT rate to the storage element FIT counter,
    (e) computing the clock ratio for the storage element,
    (f) determining the product of the clock ratio and the storage element FIT counter, and
    (g) adding the product to the storage element FIT counter; and
    after all of the storage elements in the storage element list have been read, outputting the value of the storage element FIT counter as the failure rate of the design.

2. The method of claim 1, wherein the storage elements are selected from the group consisting of flip-flops and SRAMs.

3. The method of claim 1, wherein the storage elements are non-sequential storage elements.

4. The method of claim 1, further comprising:
    inputting the design into the computational device in the form of an RTL or netlist.

5. The method of claim 1, wherein the storage elements are sequential elements, and further comprising:
    providing a software library which defines the timing window for the sequential elements in the design of the digital electronic device.

6. The method of claim 5, wherein the clock ratio for each sequential element in the design is computed based on the timing window for the sequential element.

7. The method of claim 6, wherein the storage elements are selected from the group consisting of memories and registers.

8. The method of claim 6, wherein the design for the digital electronic device includes timing constraints.

9. The method of claim 8, wherein said timing constraints contains the definition for clocks that clock the sequential elements in the design.

10. The method of claim 8, wherein the failure rates due to soft errors include failure rates for soft errors in devices selected from the group consisting of memories, registers and logic gates.

11. The method of claim 1, wherein the design is a VLSI design.

12. The method of claim 1, wherein the digital electronic device is an enterprise computer system.

13. A method for analyzing failure rates due to soft errors in the design of a digital electronic device, comprising:
    creating, on a computational device equipped with a tangible, non-transient storage medium and at least one computer processor, a list of the storage elements in the design, thereby generating a storage element list, wherein said storage element list includes all of the flip-flops and SRAMs in the device;
    determining the FIT rate for all of the storage elements;
    creating a hierarchical list of modules in the design with the leaf nodes at the head of the hierarchical list;
    for each module in the hierarchical list, implementing, with the at least one computer processor, programming instructions recorded in the storage medium which perform the steps of
    (a) summing the FIT rates for all flip-flops in the module,
    (b) summing the FIT rates for all SRAMs in the module,
    (c) summing the FIT rates for all sub-modules in the module, and
    (d) recording as the FIT rate for the module the sum of the summed FIT rates for the flip-flops, SRAMs and sub-modules; and
    outputting the name and FIT rate for each module in the hierarchical list.

14. The method of claim 13, wherein determining the FIT rate for all of the storage elements includes:
    defining a storage element FIT counter;
    for each storage element in the storage element list,
    (a) reading the storage element,
    (b) adding the FIT rate of the storage element to the storage element FIT counter,
    (c) creating a list of all of the logic cells forming the cone of logic that forms the data input to the storage element, thereby generating a logic cone list,
    (d) for each cell in the logic cone list associated with the storage element,
    (i) reading the cell, and
    (ii) if the cell is a pass through cell, then adding the FIT rate to the storage element FIT counter, and otherwise adding ½ of the FIT rate to the storage element FIT counter,
    (e) computing the clock ratio for the storage element,
    (f) determining the product of the clock ratio and the storage element FIT counter, and
    (g) adding the product to the storage element FIT counter; and
    after all of the storage elements in the storage element list have been read, outputting the value of the storage element FIT counter as the failure rate of the design.

15. The method of claim 13, wherein the method is implemented by a software analytical tool installed on the computational device, and further comprising:
    reading the design into the tool in the form of an RTL or netlist.

16. A method for creating logic for a replay cycle when a correctable ECC error is detected in an SRAM, comprising:
    creating, on a computational device equipped with a tangible, non-transient storage medium and at least one computer processor, a list of output ports for the SRAM with a delayed timing ECC wrapper;

for each output port in the list of output ports, creating on the computational device a list of end points which use the output port;

for each end point in the list of end points, creating on the computational device a list of all start points which are in the cone of logic of the endpoint;

for each start point in the list of start points, creating on the computational device shadow registers and associated logic;

creating replay enable for each end point in the list of end points; and creating a clock gating signal for elements in the design of the SRAM that are not in the list of end points.

* * * * *